United States Patent
Li et al.

(10) Patent No.: US 7,804,042 B2
(45) Date of Patent: Sep. 28, 2010

(54) PRYOMETER FOR LASER ANNEALING SYSTEM COMPATIBLE WITH AMORPHOUS CARBON OPTICAL ABSORBER LAYER

(75) Inventors: Jiping Li, Palo Alto, CA (US); Bruce E. Adams, Portland, OR (US); Timothy N. Thomas, Portland, OR (US); Aaron Muir Hunter, Santa Cruz, CA (US); Abhilash J. Mayur, Salinas, CA (US); Rajesh S. Ramanujam, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 481 days.

(21) Appl. No.: 11/764,738

(22) Filed: Jun. 18, 2007

(65) Prior Publication Data

US 2008/0308534 A1 Dec. 18, 2008

(51) Int. Cl.
*B23K 26/00* (2006.01)

(52) U.S. Cl. .............................. 219/121.66; 219/121.83; 438/45

(58) Field of Classification Search ............ 219/121.73, 219/121.74, 121.75, 121.82, 121.83; 356/237.4, 356/237.5; 438/758, 795, 798, 514
See application file for complete search history.

(56) References Cited

U.S. PATENT DOCUMENTS

| | | | |
|---|---|---|---|
| 6,183,130 B1 | 2/2001 | Adams et al. ................ 374/131 |
| 6,531,681 B1 | 3/2003 | Markle et al. ............ 219/121.8 |
| 6,747,245 B2 | 6/2004 | Talwar et al. ............ 219/121.8 |
| 6,822,787 B1 | 11/2004 | DiJaili et al. ................ 359/344 |
| 6,987,240 B2 | 1/2006 | Jennings et al. .......... 219/121.8 |
| 7,109,435 B2 | 9/2006 | Tsukihara et al. ....... 219/121.65 |
| 7,304,310 B1 * | 12/2007 | Shortt et al. ................ 250/372 |
| 2006/0228897 A1 * | 10/2006 | Timans ....................... 438/758 |
| 2006/0234458 A1 * | 10/2006 | Jennings et al. ............. 438/308 |
| 2006/0264060 A1 * | 11/2006 | Ramaswamy et al. ....... 438/758 |

* cited by examiner

*Primary Examiner*—Tu B Hoang
*Assistant Examiner*—Thien Tran
(74) *Attorney, Agent, or Firm*—Law Office of Robert M. Wallace

(57) ABSTRACT

In a laser annealing system for workpieces such as semiconductor wafers, a pyrometer wavelength response band is established within a narrow window lying between the laser emission band and a fluorescence emission band from the optical components of the laser system, the pyrometer response band lying in a wavelength region at which the optical absorber layer on the workpiece has an optical absorption coefficient as great as or greater than the underlying workpiece. A multi-layer razor-edge interference filter having a 5-8 nm wavelength cut-off edge transition provides the cut-off of the laser emission at the bottom end of the pyrometer response band.

10 Claims, 6 Drawing Sheets

PRYOMETER FOR LASER ANNEALING SYSTEM COMPATIBLE WITH AMORPHOUS CARBON OPTICAL ABSORBER LAYER

BACKGROUND

Thermal processing is required in the fabrication of silicon and other semiconductor integrated circuits formed in silicon wafers or other substrates such as glass panels for displays. The required temperatures may range from relatively low temperatures of less than 250° C. to greater than 1000°, 1200°, or even 1400° C. and may be used for a variety of processes such as dopant implant annealing, crystallization, oxidation, nitridation, silicidation, and chemical vapor deposition as well as others.

For the very shallow device features required for advanced integrated circuits, it is desired to reduce the total thermal budget in achieving the required thermal processing. The thermal budget may be considered as the total time at high temperatures necessary to achieve the desired processing results (e.g., dopant activation level). The time that the wafer needs to stay at the highest temperature can be very short.

Rapid thermal processing (RTP) uses radiant lamps which can be very quickly turned on and off to heat only the wafer and not the rest of the chamber. Pulsed laser annealing using very short (about 20 ns) laser pulses is effective at heating only the surface layer and not the underlying wafer, thus allowing very short ramp up and ramp down rates.

A more recently developed approach in various forms, sometimes called thermal flux laser annealing or dynamic surface annealing (DSA), is described by Jennings et al. in U.S. Pat. No. 6,987,240 and incorporated herein by reference in its entirety. Markle describes a different form in U.S. Pat. No. 6,531,681 and Talwar yet a further version in U.S. Pat. No. 6,747,245.

The Jennings and Markle versions use CW diode lasers to produce very intense beams of light that strikes the wafer as a thin long line of radiation. The line is then scanned over the surface of the wafer in a direction perpendicular to the long dimension of the line beam.

SUMMARY

A thermal processing system includes a source of laser radiation emitting at a laser wavelength, a beam splitting reflective member arranged to receive the laser radiation, and beam projection optics disposed between one side of the reflective member and a substrate support capable of holding a substrate to be processed. A projection optical path for the laser radiation extends from the reflecting member, through the projection optics and toward the substrate support. The system further includes a pyrometer on an opposite side of the reflective member and responsive to a pyrometer wavelength range or response band, and a pyrometer optical path extending through the reflective member and to the pyrometer. An amorphous carbon optical absorber layer covers the surface of the substrate being processed. The system further includes a pyrometer passband filter in the pyrometer optical path having a narrow passband lying in a wavelength window between the laser emission band and an emission band of fluorescence of the optical components of the projection and pyrometer optical paths. The pyrometer passband filter blocks the fluorescence emission from the pyrometer optical path. The narrow pyrometer filter passband window lies in a wavelength range within which the amorphous carbon layer has a substantial extinction coefficient on the order of or exceeding that of the underlying integrated circuit features. A multiple thin film razor edge filter in the pyrometer optical path blocks the laser emission band from the pyrometer optical path.

In one embodiment, the source of laser radiation includes an array of laser emitters. In one embodiment, the beam projection optics projects a line beam of radiation of the laser wavelength onto a substrate plane over the substrate support, and the system further includes a line beam scanning apparatus having a fast axis transverse to the line beam.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The drawings in the figures are all schematic and not to scale.

DETAILED DESCRIPTION

Figure 1:
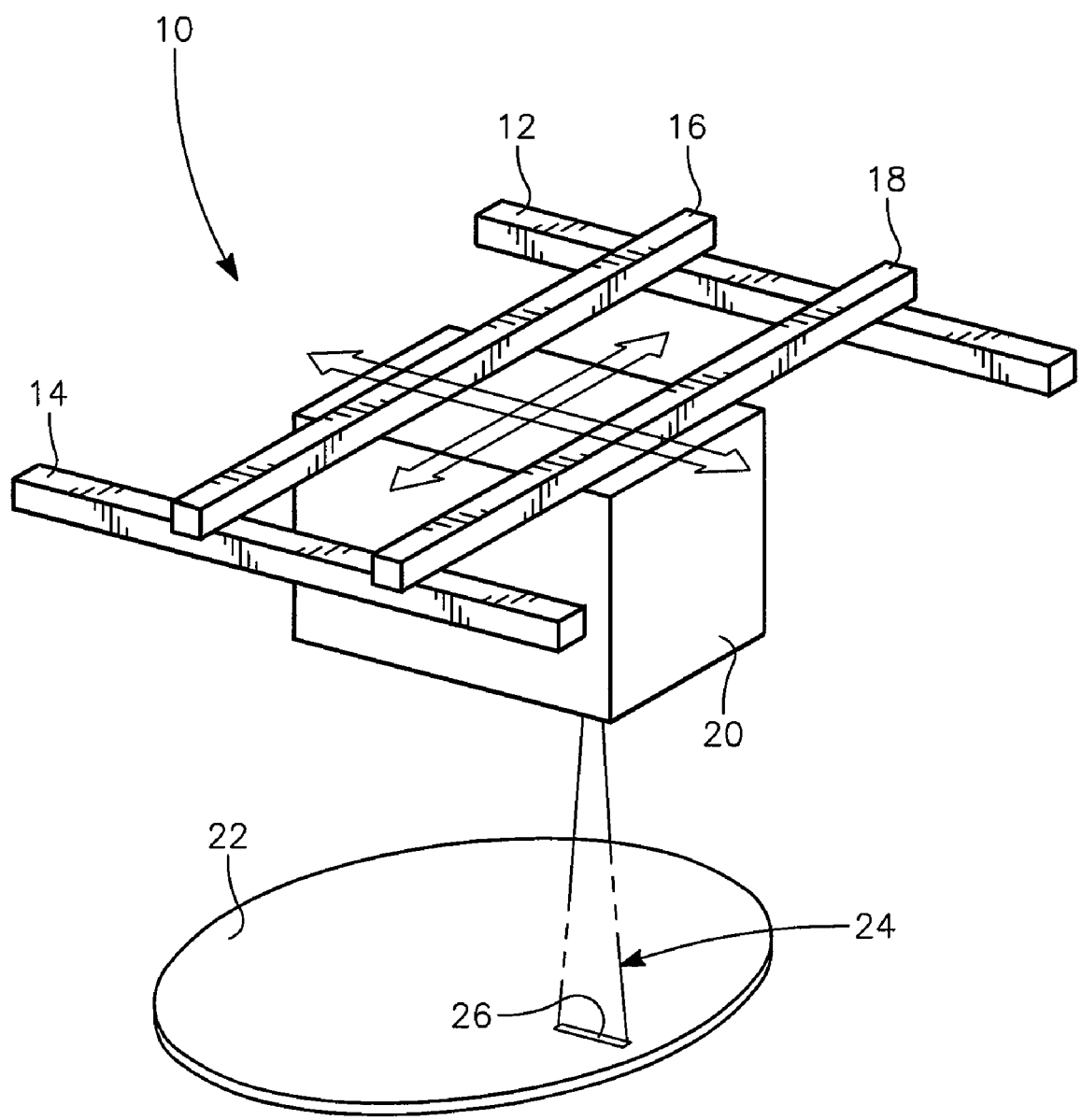
FIG. 1 is an orthographic representation of a thermal flux laser annealing apparatus employed in the present invention.

One embodiment of the apparatus described in the above-referenced U.S. patent by Jennings et al. is illustrated in the schematic orthographic representation of FIG. 1. A gantry structure 10 for two-dimensional scanning includes a pair of fixed parallel rails 12, 14. Two parallel gantry beams 16, 18 are fixed together a set distance apart and supported on the fixed rails 12, 14 and are controlled by an unillustrated motor and drive mechanism to slide on rollers or ball bearings together along the fixed rails 12, 14. A beam source 20 is slidably supported on the gantry beams 16, 18, and may be suspended below the beams 16, 18 which are controlled by unillustrated motors and drive mechanisms to slide along them. A substrate 22 to be processed, which may be a silicon wafer 22 for example, is stationarily supported below the gantry structure 10. The beam source 20 includes a laser light source and optics to produce a downwardly directed fan-shaped beam 24 that strikes the wafer 22 as a line beam 26 extending generally parallel to the fixed rails 12, 14, in what is conveniently called the slow direction. Although not illustrated here, the gantry structure further includes a Z-axis stage for moving the laser light source and optics in a direction generally parallel to the fan-shaped beam 24 to thereby controllably vary the distance between the beam source 20 and the wafer 22 and thus control the focusing of the line beam 26 on the wafer 22. Exemplary dimensions of the line beam 26 include a length of 1 cm and a width of 66 microns with an exemplary power density of 220 kW/cm$^2$. Alternatively, the beam source and associated optics may be stationary while the wafer is supported on a stage which scans it in two dimensions.

In typical operation, the gantry beams 16, 18 are set at a particular position along the fixed rails 12, 14 and the beam source 20 is moved at a uniform speed along the gantry beams 16, 18 to scan the line beam 26 perpendicularly to its long dimension in a direction conveniently called the fast direction. The line beam 26 is thereby scanned from one side of the wafer 22 to the other to irradiate a 1 cm swath of the wafer 22. The line beam 26 is narrow enough and the scanning speed in the fast direction fast enough that a particular area of the wafer is only momentarily exposed to the optical radiation of the line beam 26 but the intensity at the peak of the line beam is enough to heat the surface region to very high temperatures. However, the deeper portions of the wafer 22 are not significantly heated and further act as a heat sink to quickly cool the surface region. Once the fast scan has been completed, the gantry beams 16, 18 are moved along the fixed rails 12, 14 to a new position such that the line beam 26 is moved along its long dimension extending along the slow axis. The fast scanning is then performed to irradiate a neighboring swath of the wafer 22. The alternating fast and slow scanning are repeated, perhaps in a serpentine path of the beam source 20, until the entire wafer 22 has been thermally processed.

The optics beam source 20 includes an array of lasers. An example is orthographically illustrated in FIGS. 2, 3 and 5, in which laser radiation at about 810 nm is produced in an optical system 30 from two laser bar stacks 32, one of which is illustrated in end plan view in FIG. 4. Each laser bar stack 32 includes a number of (e.g., fourteen) parallel bars 34, generally corresponding to a vertical p-n junction in a GaAs semiconductor structure, extending laterally about 1 cm and separated by about 0.9 mm. Typically, water cooling layers are disposed between the bars 34. In each bar 34 are formed a number of (e.g., forty-nine) emitters 36, each constituting a separate GaAs laser emitting respective beams, each beam having different divergence angles in orthogonal directions. The illustrated bars 34 are positioned with their long dimension extending over multiple emitters 36 and aligned along the slow axis and their short dimension corresponding to the less than 1-micron p-n depletion layer aligned along the fast axis. The small source size along the fast axis allows effective collimation along the fast axis. The divergence angle is large along the fast axis and relatively small along the slow axis.

Returning to FIGS. 2, 3 and 5, two arrays of cylindrical lenslets 40 are positioned along the laser bars 34 to collimate the laser light in a narrow beam along the fast axis. They may be bonded with adhesive on the laser stacks 32 and aligned with the bars 34 to extend over the emitting areas 36.

Figure 2:
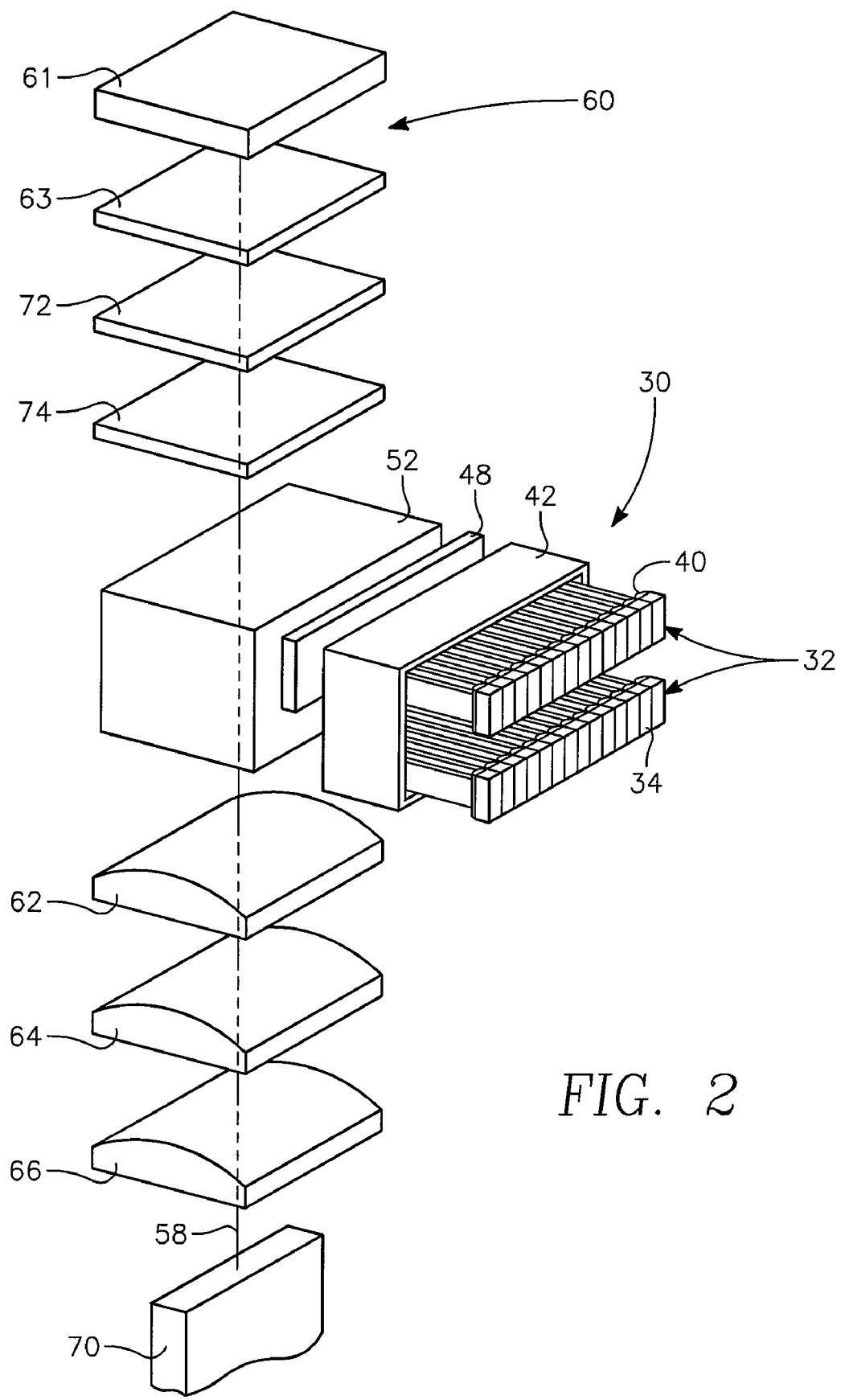
FIGS. 2 and 3 are orthographic views from different perspectives of optical components of the apparatus of FIG. 1.
Figure 3:
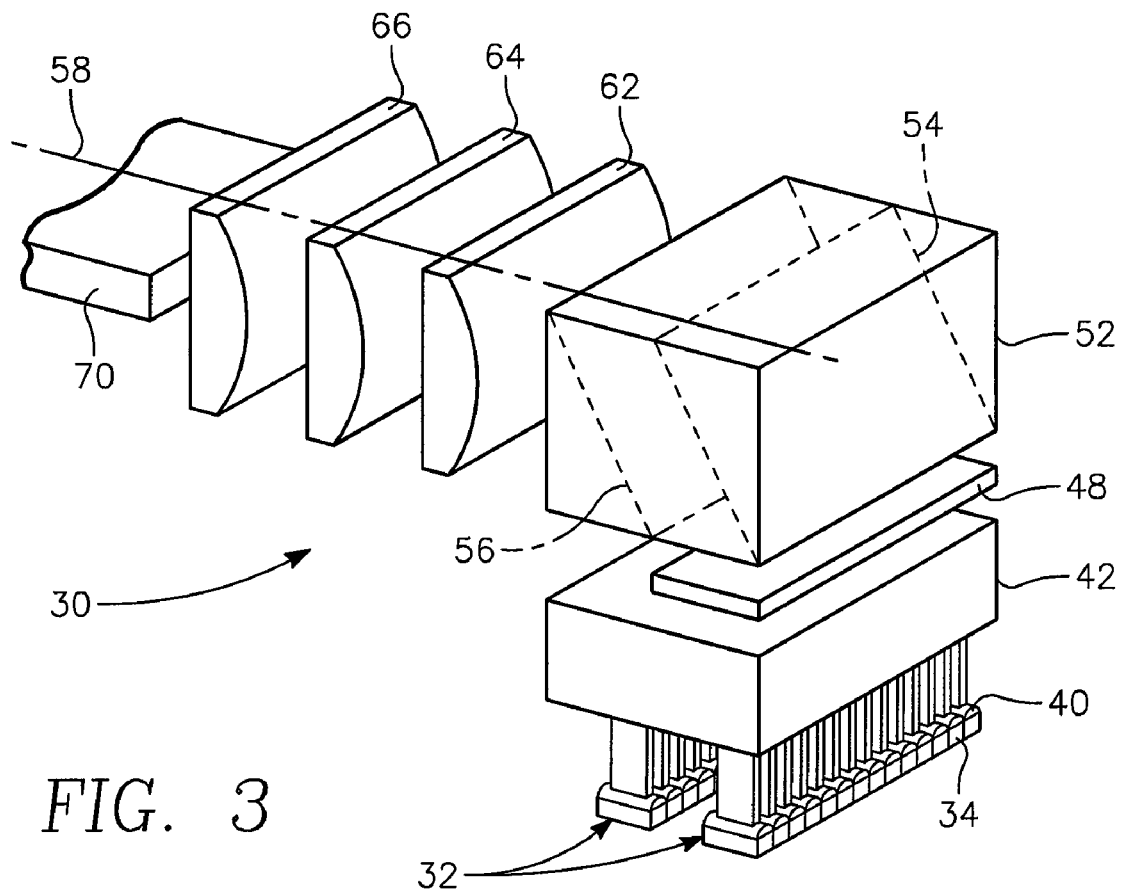
Figure 4:
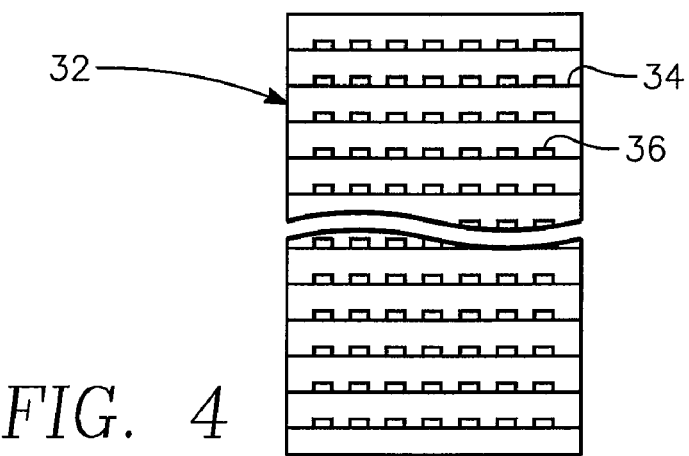
FIG. 4 is an end plan view of a portion of a semiconductor laser array in the apparatus of FIG. 1.
Figure 5:
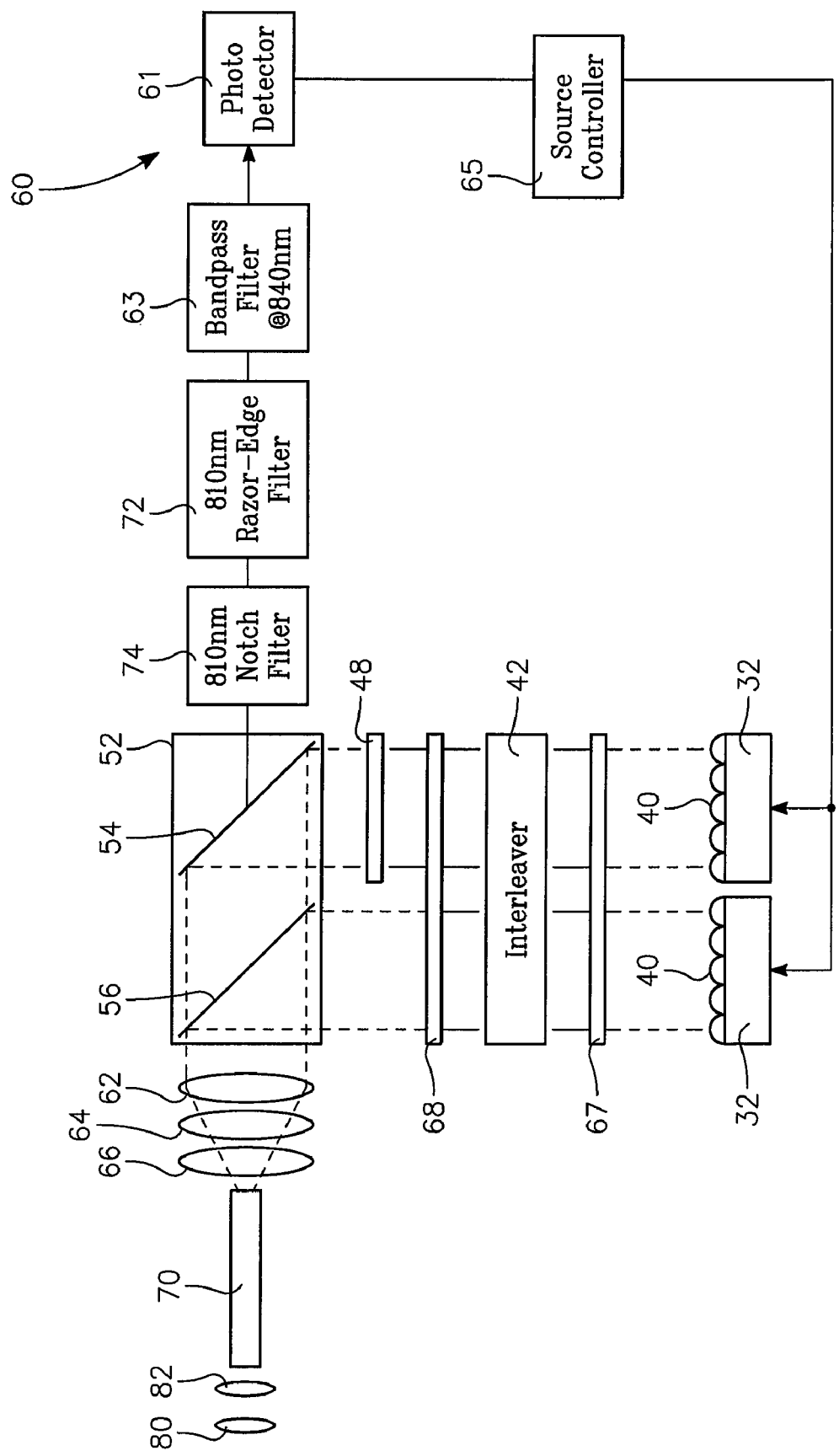
FIG. 5 is a schematic diagram of a system including the features of FIGS. 2-4.

The optics beam source 20 can further include conventional optical elements. Such conventional optical elements can include an interleaver and a polarization multiplexer, although the selection by the skilled worker of such elements is not limited to such an example. In the example of FIGS. 2, 3 and 5, the two sets of beams from the two bar stacks 32 are input to an interleaver 42, which has a multiple beam splitter type of structure with specified coatings on two internal diagonal faces, e.g., reflective parallel bands, to selectively reflect and transmit light. Such interleavers are commercially available from Research Electro Optics (REO). In the interleaver 42, patterned metallic reflector bands are formed in angled surfaces for each set of beams from the two bar stacks 32 such that beams from bars 34 on one side of the stack 32 are alternatively reflected or transmitted and thereby interleaved with beams from bars 34 on the other side of the stack 32 which undergo corresponding selective transmission/reflection, thereby filling in the otherwise spaced radiation profile from the separated emitters 36.

A first set of interleaved beams is passed through a quarter-wave plate 48 to rotate its polarization relative to that of the second set of interleaved beams. Both sets of interleaved beams are input to a polarization multiplexer (PMUX) 52 having a structure of a double polarization beam splitter. Such a PMUX is commercially available from Research Electro Optics. First and second diagonal interface layers 54, 56 cause the two sets of interleaved beams to be reflected along a common axis from their front faces. The first interface 54 is typically implemented as a dielectric interference filter designed as a hard reflector (HR) while the second interface 56 is implemented as a dielectric interference filter designed as a polarization beam splitter (PBS) at the laser wavelength. As a result, the first set of interleaved beams reflected from the first interface layer 54 strikes the back of the second interface layer 56. Because of the polarization rotation introduced by the quarter-wave plate 48, the first set of interleaved beams passes through the second interface layer 56. The intensity of a source beam 58 output by the PMUX 52 is doubled from that of either of the two sets of interleaved beams.

Although shown separated in the drawings, the interleaver 42, the quarter-wave plate 48 and the PMUX 52 and its interfaces 54, 56, as well as additional filters that may be attached to input and output faces are typically joined together by a plastic encapsulant, such as a UV curable epoxy, to provide a rigid optical system. An important interface is the plastic bonding of the lenslets 40 to the laser stacks 32, on which they must be aligned to the bars 34. The source beam 58 is passed through a set of cylindrical lenses 62, 64, 66 to focus the source beam 58 along the slow axis.

A one-dimensional light pipe 70 homogenizes the source beam along the slow axis. The source beam, focused by the cylindrical lenses 62, 64, 66, enters the light pipe 70 with a finite convergence angle along the slow axis but substantially collimated along the fast axis. It has a short dimension along the slow axis and a longer dimension along the fast axis.

The source beam output by the light pipe 70 is generally uniform. Anamorphic optics 80, 82 depicted in FIG. 5 focus the source beam into the line beam of desired dimensions on the surface of the wafer 22.

In one embodiment, the same optics that focus the laser source light on the wafer also direct thermal radiation emitted from the neighborhood of the line beam 26 on the wafer 22 in the reverse direction to a pyrometer 60, schematically illustrated in FIG. 5. As will be described below, the pyrometer is responsive to a limited wavelength range, which is referred to in this specification as the pyrometer response band, the center wavelength in this band being referred to in this specification as the pyrometer wavelength. The two PMUX interfaces 54, 56 are designed to pass the pyrometer wavelength irrespective of its polarization. The optics are generally reciprocal and thus in the reverse direction detect only a small area of the wafer 22 on or very near to the line beam 26 and optically expands that image to an area generally having a size of the emission face of the bar stacks. Although with small laser-beam annealing, there is significant variation of surface layer temperatures even in the immediate neighborhood of the line beam 26, the nature of the blackbody radiation spectrum causes the hottest areas to dominate the thermally emitted radiation.

The variation in temperature across the area of the wafer illuminated by the powerful laser line beam arises from the presence of different features on the wafer surface that absorb the laser radiation at different rates (because they have different extinction coefficients) or have uneven surfaces that reflect in different directions. In order to obtain a more uniform heating of the wafer during the DSA laser annealing, the entire wafer surface is covered with an optical absorption layer prior to laser annealing. The optical absorption layer in one embodiment is an amorphous carbon layer because it has a substantial absorption coefficients at the laser wavelength (810 nm) and at the pyrometer wavelength (e.g., 950 nm) exceeding those of the underlying integrated circuit features on the wafer. Therefore, the uniform heat absorption of the amorphous carbon layer predominates over the non-uniformities of the underlying integrated circuit structures. Moreover, the blackbody radiation uniformly emitted by the amorphous carbon layer at the pyrometer wavelength predominates over radiation emitted by the non-uniform integrated circuit elements underlying the amorphous carbon layer. This prevents underlying integrated circuit pattern effects from distorting the pyrometer measurements of wafer temperature.

The pyrometer 60 includes an optical detector 61, such as a photodiode, and an optical pyrometer bandpass filter 63. The pyrometer filter 63 helps establish the pyrometer response band. Conventionally, one possible pyrometer response band could be centered at 1550 nm. However, the amorphous carbon optical absorber layer covering the wafer for uniform absorption, as well as the Si substrate itself, does not absorb well (has a lower extinction coefficient) at such a long wavelength, and therefore does not improve uniformity of absorption and blackbody radiation emission. The surface emissivity at this wavelength also changes with the wafer temperature. Therefore, 1550 nm is not a good choice for the pyrometer response band.

Another possible choice is to center the pyrometer response band at the shorter wavelength 950 nm with a bandwidth of a few tens of nm. This may be achieved by providing the pyrometer passband filter 63 with a passband center wavelength near 950 nm. At this shorter wavelength, the amorphous carbon optical absorber layer absorbs well and therefore provides uniform absorption of the laser radiation across the wafer surface.

The output of the photodetector 61 is supplied to a source controller 65, which converts the detected photocurrent to a wafer temperature and compares it to a desired temperature and thereby adjusts the power supplied to the laser bars 32 to increase or decrease their optical output in the direction of the desired wafer temperature.

The GaAs or other semiconductor lasers have a fairly wide spectrum of low-level spontaneous emission that typically overlaps the pyrometer wavelength response band. As a result of the spontaneous emission, which the pyrometer filter 63 does not block at the pyrometer wavelength, the photodetector 61 would detect both: (a) the wafer blackbody radiation at the pyrometer wavelength and (b) the portion of the laser source spontaneous emission at the pyrometer wavelength, in the absence of additional filtering.

The pyrometer performance can be improved by filtering out the laser source spontaneous radiation at the pyrometer wavelength with a notch filter 67 placed between the bar stacks 32 and the interleaver 42, or with a notch filter 68 placed between the interleaver 42 and the PMUX 52. The notch filter 67 or the notch filter 68 blocks the source radiation at the pyrometer wavelength, e.g. 950 nm, and passes at least the laser radiation at 810 nm. The ratio of the transmission coefficient of the laser wavelength to that of pyrometer wavelength should be several orders of magnitude. A minimum requirement of the filters 67, 68 is that they block wavelengths longer than the laser wavelength (e.g., longer than the laser wavelength 810 nm), although radiation at shorter wavelengths does not inherently degrade the pyrometer. The notch filters 67, 68 may be implemented as interference filters coated on either the interleaver 42 or the PMUX 52, although they may be implemented as stand alone filters.

Filtering Out Spurious Noise at the Pyrometer

The pyrometer 60 experiences a high level spurious background signal which distorts the temperature measurement function of the pyrometer. This poses a severe problem in the closed feedback control loop of the source controller 65, since the spurious background signal varies with laser power and wafer surface reflectivity non-uniformity. We have discovered that this background signal is caused by the fluorescence of the optical components such as the beam splitter 52, the lenses 62, 64, 66 and other components illustrated in FIG. 5. The fluorescence background signal is particularly acute when the optical components are formed of a fused quartz material. One example of such material is an optical glass material sold under the registered trademark Infrasil® owned by Heraeus Quarzglas G.M.B.H. This material is sold by Heraeus Quartz America, L.L.C. Other related materials which may be more expensive than the Infrasil® material may have somewhat lower fluorescence but nevertheless to emit fluorescence that hampers temperature measurement. The fluorescence of the Infrasil® material has a peak amplitude near the conventional choice of pyrometer wavelength, 950 nm, which can equal or exceed the amplitude of the blackbody radiation from the wafer at the pyrometer wavelength of 950 nm. Since the Infrasil® fluorescence has a maximum or peak at the pyrometer wavelength (950 nm), the fluorescence is passed by the pyrometer optics, to become a strong spurious background signal that distorts temperature measurements by the pyrometer.

Figure 6:
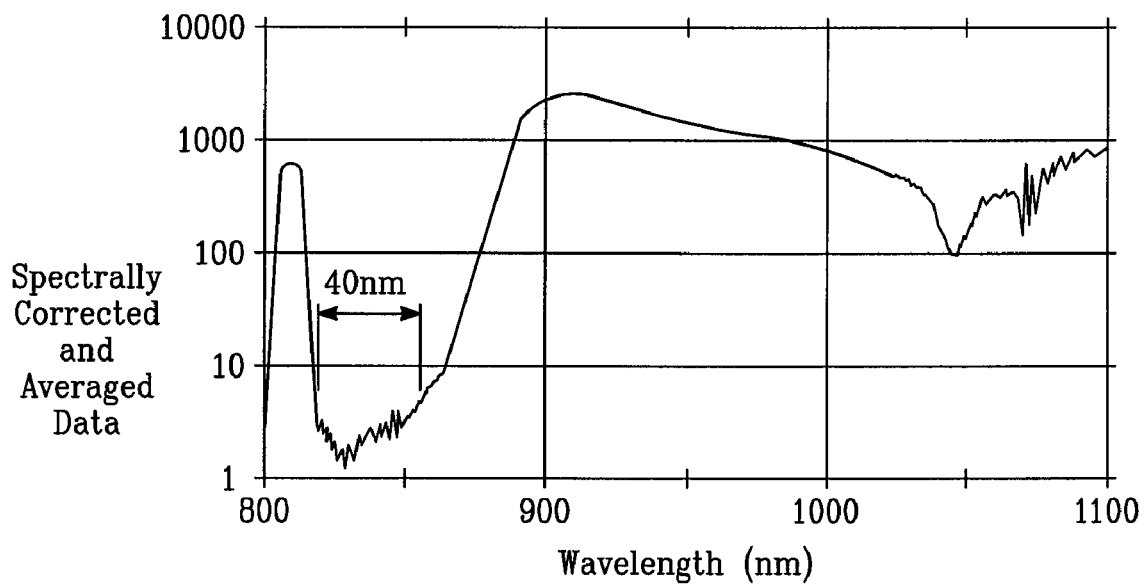
FIG. 6 is a graph depicting the spectrum of radiation presented to the pyrometer optical path, including a laser radiation peak at 810 nm and a fluorescence peak at 950 nm.
Figure 7:
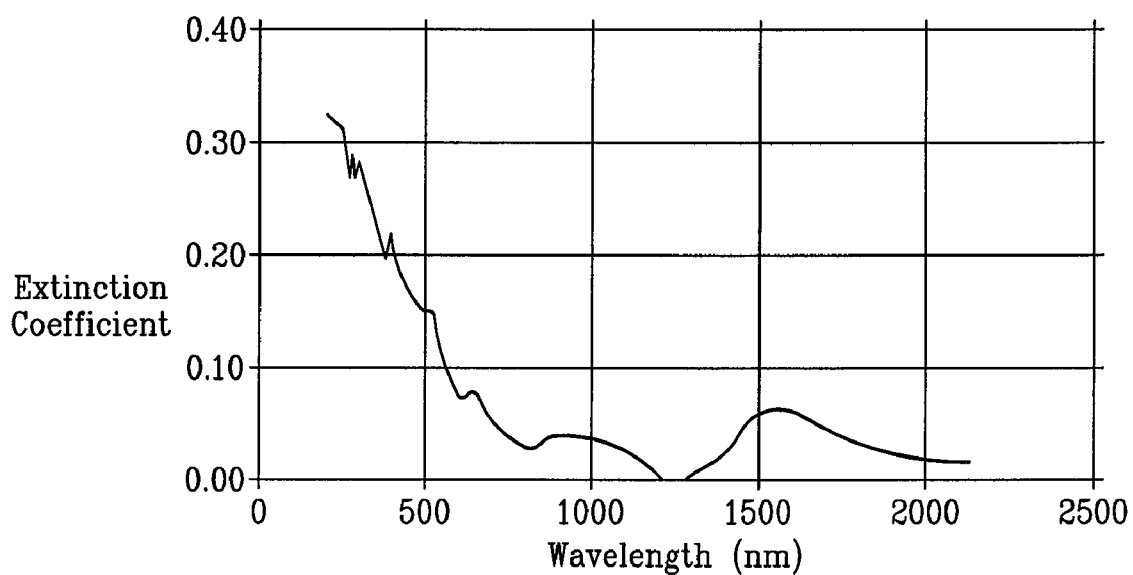
FIG. 7 is a graph depicting the extinction coefficient of the amorphous carbon optical absorber layer on the wafer as a function of wavelength.

The spectrum of radiation present in the system is depicted in the graph of FIG. 6. The peak near 810 nm corresponds to the CW laser radiation, this emission being within a band lying between about 805 nm and 815 nm, according to the graph of FIG. 6. The peak near 950 nm corresponds to the fluorescence of the optical components. This fluorescence has a dip near 1100 nm. Therefore, one possible approach is to move the pyrometer response band (the passband of the filter 63) to about 1100 nm, to avoid much of the fluorescence of the optical components. Such an approach, however, conflicts with the purpose of the amorphous carbon optical absorber layer covering the wafer. This is because the amorphous carbon layer has low optical absorption at this longer wavelength (and therefore correspondingly low blackbody emission at this wavelength), and therefore provides less improvement in uniformity of the temperature measurement. The situation is depicted in the graph of FIG. 7, showing the extinction coefficient of the amorphous carbon layer as a function of wavelength. The extinction coefficient is an indicator of the efficiency with which the amorphous carbon material absorbs radiation. FIG. 7 shows that the amorphous carbon layer extinction coefficient falls to a very low level above a wavelength of 1000 nm. Therefore, increasing the pyrometer wavelength above 950 is not a practical approach.

We have discovered that there is a 40 nm wide window between the 805 nm-815 nm laser emission band and the onset of the fluorescence (from the optical components) at about 855 nm or 860 nm. The location of this 40 nm window is indicated in FIG. 6. Within this 40 nm window, there is little or no laser emission and little or no fluorescence from the optical components. Moreover, referring to FIG. 7, within this window (i.e., between 815 nm and 855 nm), the amorphous carbon optical absorber layer has a reasonably strong extinction coefficient, e.g., between about 0.05 and 0.10. Therefore, restricting the pyrometer response band to fit within the narrow 40 nm window (FIG. 6), places it in a region of high extinction coefficient of the amorphous carbon layer, low fluorescence emission from the optical components and insignificant laser emission. By restricting the pyrometer response band to a region of relatively high extinction coefficient of the amorphous carbon layer, the amorphous carbon layer on the wafer absorbs more of laser radiation, and therefore its uniform absorption dominates, providing a uniform annealing process across the wafer surface. In the pyrometer response band of the 40 nm-wide window, the optical absorber (amorphous carbon) layer has an optical absorption coefficient that is at least as great as or greater than the optical absorption coefficient of the underlying substrate.

Figure 8:
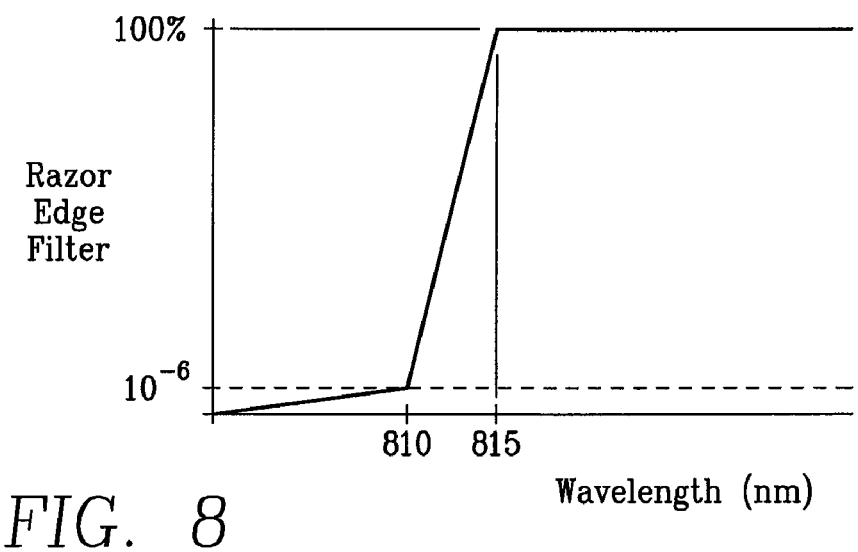
FIG. 8 is a graph depicting the response of a razor-edge long wavelength pass filter used in the system of FIG. 5.

However, the 40 nm window is too close to the laser emission band (centered around the laser wavelength) for a typical filter used to implement the pyrometer response band filter 63. In particular, the wavelength difference between the laser radiation peak at 810 nm and the beginning of the 40 nm window at 815 nm is extremely small. It is therefore difficult to block the laser radiation at 810 nm without also blocking the desired blackbody radiation (pyrometer signal) at 840 nm. This problem is solved by providing a razor-edge optical filter 72 in the system of FIGS. 2 and 5, so that the conventional passband filter 63 is not required to block the laser radiation at 810 nm. In fact, the response of the conventional passband filter 63 may be such as to admit at least much of the laser radiation and thereby avoid inadvertently blocking or partially blocking the pyrometer wavelengths in the pyrometer response band. Blocking of the laser radiation is performed instead by the razor edge filter 72. The razor-edge optical filter 72 is a long wavelength pass filter, and has the optical response depicted in the graph of FIG. 8. The cut-off wavelength of the razor edge filter 72 is at about 815 nm. The razor edge filter 72 has an edge transition from a transmittance of nearly 100% (full transmission or transparency) above the cut-off wavelength to only $10^{-6}$ at (and below) the cut-off wavelength of 815 nm. This edge transition is extremely narrow, only five to eight nanometers wide. As a result, the razor edge filter blocks the laser radiation at 810 nm but is fully transparent to the pyrometer wavelength above 815 nm. Such an extremely sharp response is obtained by constructing the razor edge filter 72 as an interference filter.

Interference filters are multilayer thin-film devices. They can be designed to function as an edge filter or bandpass filter. In either case, wavelength selection is based on the property of destructive light interference. In such a filter, incident light is passed through many pairs of coated reflecting surfaces. The distance between the reflective coatings determines which wavelengths destructively interfere and which wavelengths are in phase and will ultimately pass through the coatings. The gap between the reflecting surfaces is a thin film of dielectric material called a spacer. It has a thickness of one-half wave at the desired peak transmission wavelength. The reflecting layers can consist of several film layers, each of which is a quarter wavelength thick. This sandwich of quarterwave layers is made up of an alternating pattern of high and low index material, usually zinc sulfide and cryolite, respectively. Together, the quarterwave coatings forming the reflective layer is called a stack. There may be many stacks in the filter 72 to achieve the sharp cut-off response depicted in FIG. 8. Such a razor-edge optical filter is available from Semrock, of Rochester, N.Y.

Figure 9:
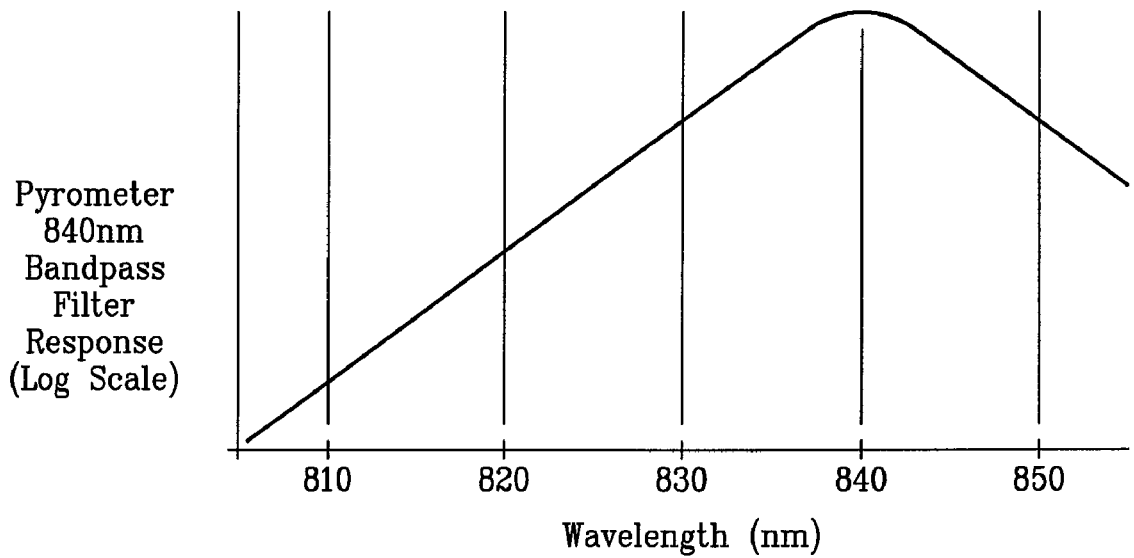
FIG. 9 is a graph depicting the response of the pyrometer bandpass filter in the system of FIG. 5.

Referring again to FIG. 5, the conventional bandpass filter 63 is selected to have a passband centered at about 840 nm, i.e., at about the center of the 40 nm window depicted in FIG. 6. In one implementation, the 840 nm passband filter 63 has a full width half maximum of 10 nm, roughly corresponding to the response depicted in the graph of FIG. 9. Being centered at 840 nm, it effectively blocks the fluorescence background emission from the optical components corresponding to the 950 nm peak in the graph of FIG. 6. Thus, the pyrometer response band is established within the 40 nm window of FIG. 6 by the razor-edge filter 72 blocking radiation below about 815 nm and the pyrometer passband filter 63 blocking radiation above about 860 nm. In an alternative embodiment, the system of FIG. 5 further includes an optional notch filter 74 that blocks the laser emission at 810 nm.

While the foregoing is directed to embodiments of the invention, other and further embodiments of the invention may be devised without departing from the basic scope thereof, and the scope thereof is determined by the claims that follow.

What is claimed is:

1. A method of laser-annealing a substrate, comprising:
    emitting laser radiation at a laser wavelength between about 805 nm and about 815 nm;
    passing said laser radiation in a forward direction through a beam splitter and projection optics to a substrate, at least one of the beam splitter and the projection optics comprising material having a fluorescence wavelength band lying at or above about 855 nm and above said laser wavelength;
    imaging the region of the substrate illuminated by the laser radiation onto a pyrometer through a pyrometer optical path, and admitting radiation through said pyrometer optical path lying in a pyrometer response band above the laser wavelength and below the fluorescence wavelength band; and
    blocking radiation wavelengths in the pyrometer optical path below a cut-off wavelength edge transition and passing radiation wavelengths above said wavelength edge transition, said wavelength edge transition being less than 10 nm wide, said wavelength edge transition being above said laser wavelength and below said pyrometer response band;
    blocking radiation wavelengths in the pyrometer optical path that lie within and above the fluorescence wavelength band.

2. The method of claim 1 further comprising coating the substrate with an optical absorber layer comprising an amorphous carbon material prior to exposing the substrate to the laser radiation, said pyrometer response band lying in a wavelength range at which said amorphous carbon layer has an absorption coefficient at least as great as said substrate.

3. The system of claim 2 wherein said pyrometer response band lies in a wavelength range at which said amorphous carbon layer has an absorption coefficient greater than that of said substrate.

4. The system of claim 2 wherein said edge transition is between about 5 nm and about 8 nm wide, wherein said blocking the wavelengths below said edge transition comprises attenuating the wavelengths below said edge transition by a factor on the order of $10^{-6}$.

5. The system of claim 4 wherein said laser wavelength and said cut-off wavelength edge transition are separated by about 5 nm.

6. The system of claim 4 wherein said laser wavelength is about 810 nm, said fluorescence wavelength band is in a wavelength range from about 860 nm and peaking at about 950 nm, said pyrometer response band lies between about 820 nm and 860 nm, and said cut-off wavelength edge transition is near 815 nm.

7. A method of laser-annealing a substrate, comprising:
   covering the substrate with an optical absorber layer;
   emitting laser radiation at a laser wavelength between about 805 nm and about 815 nm as a line beam using optical components comprising material having a fluorescence wavelength band lying at or above about 855 nm and above said laser wavelength; and
   imaging the region of the substrate illuminated by the laser radiation onto a pyrometer through a pyrometer optical path, and admitting radiation through said pyrometer optical path lying in a pyrometer response band above the laser wavelength and below the fluorescence wavelength band while blocking radiation in the pyrometer optical path outside of the pyrometer response band, said pyrometer response band lying in a wavelength region within which said optical absorber layer has an optical absorption coefficient at least as great as that of the substrate.

8. The method of claim 7 wherein the blocking radiation outside of the pyrometer response band comprises:
   blocking radiation wavelengths in the pyrometer optical path below a cut-off wavelength edge transition and passing radiation wavelengths above said edge transition, said edge transition being less than 10 nm wide, said edge transition being above said laser wavelength and below said pyrometer response band; and
   blocking radiation wavelengths in the pyrometer optical path that lie within the fluorescence wavelength band.

9. The system of claim 8 wherein said edge transition is between about 5 nm and about 8 nm wide, wherein said blocking the wavelengths below said edge transition comprises attenuating the wavelengths below said edge transition by a factor on the order of $10^{-6}$.

10. The system of claim 7 wherein the optical absorber layer comprises amorphous carbon.

* * * * *